July 21, 1942.   A. I. UMSCHWEIF   2,290,850
FOLDING WING AIRPLANE
Filed Oct. 9, 1940   2 Sheets-Sheet 1

INVENTOR
ALFRED I. UMSCHWEIF
BY
Bean, Brooks, Buckley & Bean.
ATTORNEYS

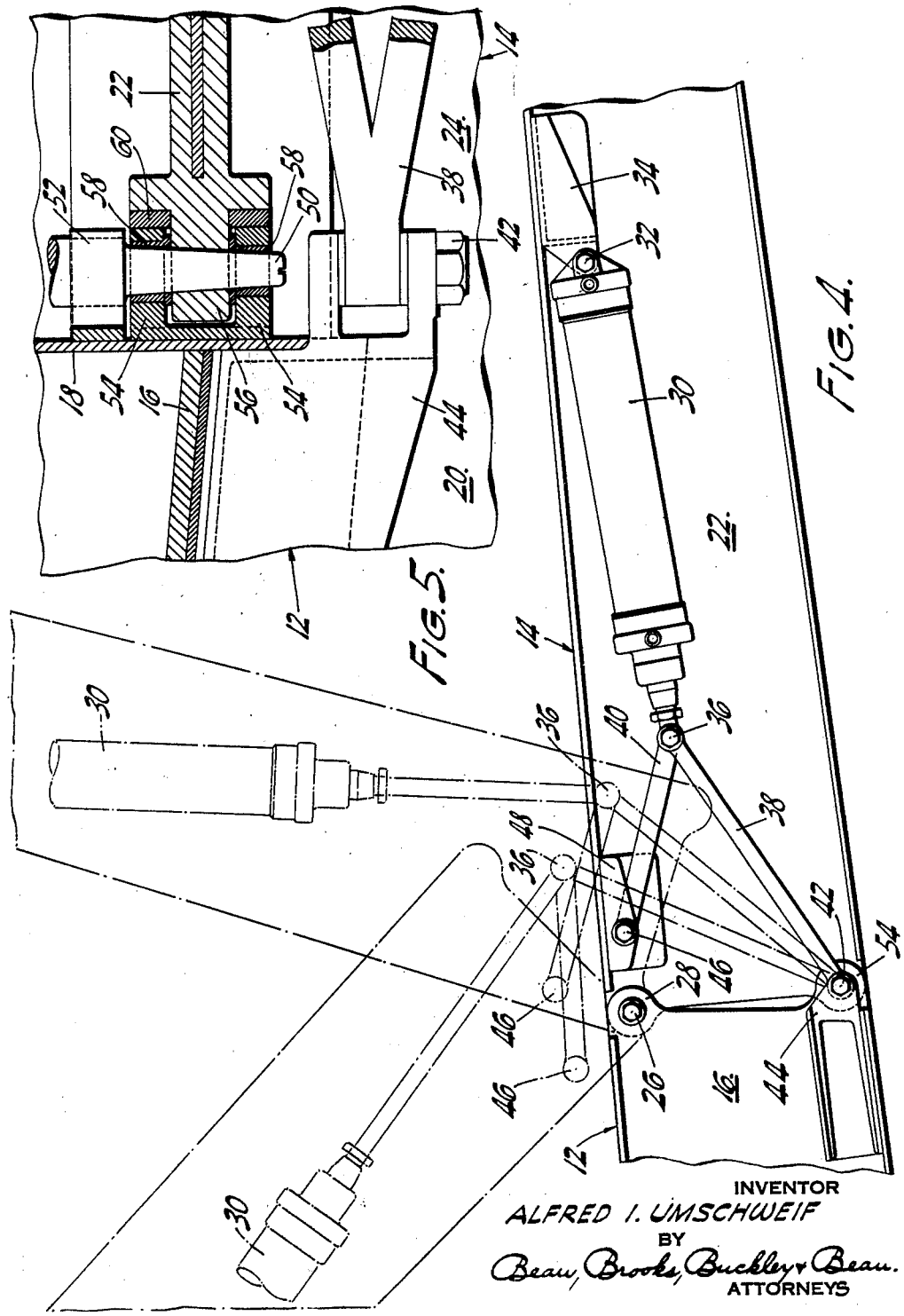

Patented July 21, 1942

2,290,850

UNITED STATES PATENT OFFICE 2,290,850

FOLDING WING AIRPLANE

Alfred I. Umschweif, Bronx, N. Y., assignor to Brewster Aeronautical Corporation, Long Island City, N. Y.

Application October 9, 1940, Serial No. 360,432

7 Claims. (Cl. 244—49)

This invention relates to aircraft, and more particularly to actuating and supporting devices for airplane folding wing panels.

The primary object of the invention is to provide an improved form of airplane having foldable wing panels and supporting and actuating means therefor, so as to be adapted to be stored within restricted spaces such as beneath deck in an airplane carrying sea vessel, or the like. Another object of the invention is to provide, in a mechanism of the character described, an improved folding wing actuating gear of rugged and simplified form in which the loads upon the structural elements thereof are nearly uniform throughout all phases of the gear movement. Another object of the invention is to provide a foldable wing control device adapted to function simultaneously as a hinge actuating gear and a wing panel supporting structure which forms in effect, at all phases of the wing folding movement a relatively deep supporting truss disposed substantially within the compass of the wing structure. Other objects and advantages of the invention will appear from the following part of the specification.

In the drawings:

Fig. 4 is a fragmentary front elevation, on an enlarged scale, of a wing panel hinging and supporting truss mechanism of the invention, illustrating diagrammatically corresponding positions of essential elements of the mechanism in different positions of adjustment thereof; and Fig. 5 is a fragmentary horizontal section, on an enlarged scale, through a wing panel locking device of the mechanism.

Figure 1:
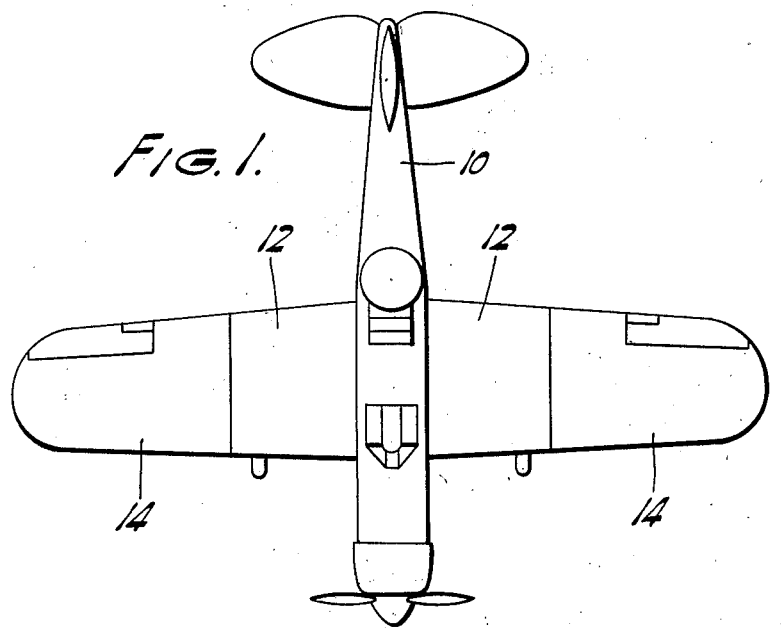
Fig. 1 is a plan of an airplane of the invention, with the foldable wing panels thereof in extended or flying attitude.
Figure 2:
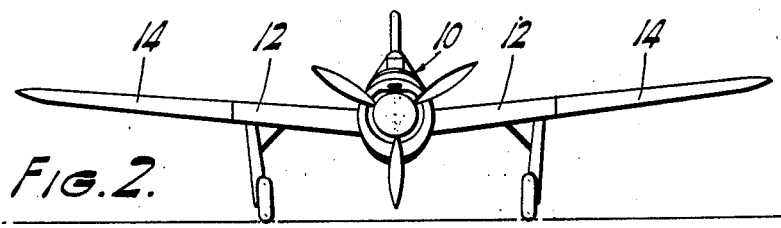
Fig. 2 is a front elevation thereof.
Figure 3:
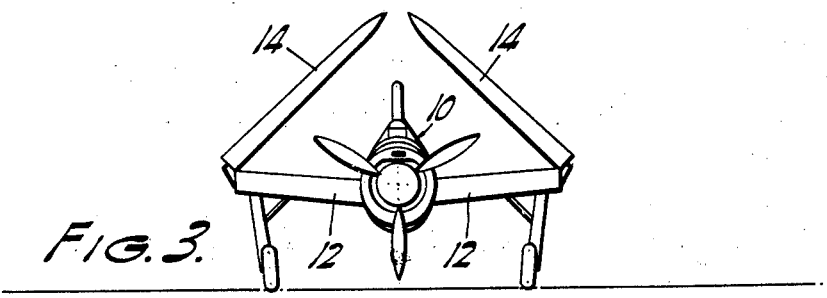
Fig. 3 is a front elevation similar to Fig. 2 but showing the wing panels of the airplane in folded attitude.

The invention is illustrated herein in conjunction with an airplane fuselage designated generally in Figs. 1 to 3 by the numeral 10 and provided with oppositely extending fixed wing portions 12 to which are hinged corresponding folding wing panels 14. Fig. 4 illustrates a typical hinge and wing actuating device of the invention in conjunction with a fixed wing portion 12 and a folding wing panel 14. As shown therein, the fixed wing portion 12 includes a spar member 16 connected at its outer end to a transverse end wall plate 18 (Fig. 5) to provide the structure upon which the wing covering formers (not shown) are mounted to support the covering skin 20. Likewise, the folding wing panel 14 includes a framing structure comprising a spar 22 for support of the wing former members and the covering skin 24 thereof. The spar members 16 and 22 are pivotally connected together at a horizontal hinge axis adjacent the upper surface of the wing by means of a pin 26 extending through lapped ear portions 28 of the respective spars; and thus, unless otherwise retarded, the outer wing panel 14 is freely pivotable about the horizontal axis of the pin 26 from the solid line position thereof through the various broken line positions illustrated in Fig. 4, and from the position illustrated in Figs. 1 and 2 to the wing folded position illustrated in Fig. 3. It will be understood that the hinge connection 26—28 of Fig. 4 may be duplicated chordwise of the wing structure as required to provide a stable hinged mounting of the wing panel 14 upon the fixed portion 12.

The folding wing panel supporting and actuating gear of the invention is illustrated as comprising, in combination, the hinge connection 26—28 and a hydraulic jack 30 pivotally connected at one of its ends by means of a pin 32 to a fixed bracket portion 34 of the spar 22 and at the other of its ends by means of a pin 36 to a pair of links 38—40. The link 38 is pivotally connected at its opposite end by means of a pin 42 to a bracket portion 44 extending rigidly from a lower portion of the spar 16, and the link 40 is pivotally connected at its opposite end by means of a pin 46 to a bracket portion 48 extending rigidly from an upper portion of the spar 22. Thus the pin connections 42 and 46 are substantially spaced apart vertically and are disposed at opposite sides of the line of action of the hydraulic jack 30 when the gear is in wing panel extended position, as illustrated by solid lines in Fig. 4. Consequently, whenever the hydraulic jack 30 is actuated so as to expand and to extend the distance between its connection points 32 and 36, a force will be exerted thereby in opposite directions against the pin connections 32 and 36 which will be in turn transmitted through the links 38—40 so as to tend to extend the distance between the connection devices 32 and 42; thus forcing the movable wing panel 14 upwardly about the hinge axis 26 toward the substantially vertical broken line positions thereof illustrated in Fig. 4.

As the wing panel 14 hinges upwardly the link 40 pivots upon the pin 46 to maintain the pivotal connection point 36 at a substantial distance from the hinge axis 26 so as to dispose the line of action of the jack 30 through a substantial effective moment arm relative to the hinge axis against the pin 42 in such manner as to provide a substantial mechanical advantage for the actuating elements of the device throughout the entire range of folding movement of the wing panel 14. In this connection, it is to be noted that although the effects of the forces of gravity upon the wing panel are substantially decreased whenever the wing panel 14 is in approximately vertical attitudes it is thereupon subject to greatly increased cross wind forces from which it is substantially free when disposed in wing extended position. Therefore, it is of great importance that when the wing is in a vertically disposed position the structural system connecting the hydraulic jack and the fixed spar member be in such condition as to provide in effect a deep truss; and, as illustrated in Fig. 4, the link system of the invention effectively braces the movable wing panel 14 with respect to the fixed panel 12 throughout all phases of the wing panel movement. For example, when the wing panel 14 is within range of the broken line positions illustrated in Fig. 4 the truss system defined by the points 32, 46, 26, 42 and 36 provides a deeply braced truss system by reason of the fact that the point 36 is laterally offset a substantial distance from the base line of the points 32, 46, 26 and 42.

Thus, the pressure of the fluid within the hydraulic jack 30 will provide a force to swing the wing panel 14 from extended position to and through upright position; and thereafter the panel 14 will tend to swing by gravity down to the fully retracted position illustrated in Figs. 3 and 4. During this latter movement of the wing panel the pressure of fluid within the hydraulic jack 30, under control of the control valve therefor, will prevent uncontrolled movement of the wing panel 14 in response to the forces of gravity or any other externally applied forces such as cross winds, or the like. At all stages of the wing panel movement the wing panel 14 is strongly braced relative to the fixed wing portion 12, and these features of the invention are obtained through use only of structural elements which nest themselves completely and compactly within the wing contour in all stages of the wing adjustment. Thus, a simplified and rugged and improved folding wing actuating and supporting gear is provided.

It will be understood that the hydraulic jack 30 may be of any suitable type such as presently known in the art and that the operation of the gear will be effected by suitable valve means controlled from either internally or externally of the airplane by means of any suitable form of control device (not shown). It will also be understood that, in lieu of the hydraulic jack 30 described hereinabove, any other suitable form of motor device may be employed such as an electric motor operated screw, or the like, and that the wing panel actuating and supporting gear illustrated in Fig. 4 may be duplicated chordwise of the wing structure, if desired, to stabilize the wing panel adjusting movements and support.

It will also be understood that suitable locking devices will be preferably employed in conjunction with the wing structure so as to enable the panel 14 to be locked relative to fixed portions of the airplane when in wing extended and folded positions. For example, as illustrated in Fig. 5, a locking pin 50 may be slidably mounted within a bearing portion 52 of the fixed wing panel 12 so as to be slidable into registering apertured portions of a pair of ears 54 extending from the fixed spar 16 and an ear 56 extending from the moving wing spar 22. Suitable bushings 58 are disposed within the apertured portions of the ears 54, and a shock pad 60 is mounted upon the end of the spar 22 in registry with the fixed spar ears 54 so as to act as a cushioning bumper between the abutting members at the end of downwardly hinging movements of the wing panel 14. It will be understood that the locking pin 50 may be actuated into and out of locking engagement with the the spar ears 54 and 56 by any suitable means manually controlled from either internally or externally of the airplane; and that a similar form of locking device may be provided in conjunction with the wing panel 14 and other fixed portions of the airplane for locking the movable wing panel 14 in upwardly folding position, or that any other suitable form of locking devices may be employed in lieu of the specific form illustrated in Fig. 5 for the purpose described.

It will also be understood that the wing actuating mechanism of the invention is adapted to control with equal facility the movements of the hinged wing panels 14 from the positions illustrated in Fig. 2 and upwardly through vertical positions and therebeyond to the positions illustrated in Fig. 3, and in reverse order downwardly therefrom to wing extended position; and that during all movements away from vertical attitudes of the wing panel the hydraulic jack 30 and the link devices 38 and 40 will function to restrain undesired movements of the wing panels, as for example, in response to strong cross wind pressures or forces of gravity, or the like.

Although only one form of the invention has been shown and described in detail, it will be apparent to those skilled in the art that the invention is not so limited but that various changes may be made therein without departing from the spirit of the invention or the scope of the appended claims.

What is claimed is:

1. Aircraft structure comprising a pair of normally abutting airfoils having a pair of spaced opposite outer surfaces, each surface being substantially continuous with respect to the pair of airfoils when the airfoils are in abutment, a pivotal connection between said airfoils adjacent a first one of said surfaces, motor means attached to a first one of said airfoils and having a projecting and retracting element directed toward the second of said airfoils, a link pivoted to said first airfoil adjacent said first surface and pivotally attached at its outer end to the projecting and retracting element for defining movement thereof in a predetermined arc with respect to said first airfoil, said arc of movement being generally adjacent the second of said pair of spaced surfaces, and a second link connecting pivotally between the pivotal connection of the first link with the projecting and retracting element and a point on said second airfoil adjacent said second surface.

2. Aircraft structure comprising a pair of normally abutting airfoils having a pair of spaced opposite outer surfaces, each surface being substantially continuous with respect to the pair of airfoils when the airfoils are in abutment, a pivotal connection between said airfoils adjacent a first one of said surfaces, motor means attached to a first one of said airfoils and having a projecting and retracting element directed toward the second of said airfoils, a link pivoted to said first airfoil adjacent said first surface and pivotally attached at its outer end to the projecting and retracting element for defining movement thereof in a predetermined arc with respect to said first airfoil, said arc of movement being generally adjacent the second of said pair of spaced surfaces, and a second link connecting pivotally between the projecting and retracting element and a point on said second airfoil adjacent said second surface.

3. Aircraft structure comprising a pair of normally abutting airfoils having a pair of spaced opposite outer surfaces, each surface being substantially continuous with respect to the pair of airfoils when the airfoils are in abutment, a pivotal connection between said airfoils adjacent a first one of said surfaces, motor means attached to a first one of said airfoils and having a projecting and retracting element directed toward the second of said airfoils, a link pivoted to said first airfoil adjacent said first surface and pivotally attached at its outer end to the projecting and retracting element for defining movement thereof in a predetermined arc with respect to said first airfoil, said arc of movement being generally adjacent the second of said pair of spaced surfaces, and a second link connecting pivotally between the first link and a point on said second airfoil adjacent said second surface.

4. Aircraft structure comprising a pair of normally abutting airfoils having a pair of spaced opposite outer surfaces, each surface being substantially continuous with respect to the pair of airfoils when the airfoils are in abutment, a pivotal connection between said airfoils adjacent a first one of said surfaces, motor means attached to a first one of said airfoils and having a projecting and retracting element directed toward the second of said airfoils, a link connecting pivotally between the outer end of the projecting and retracting element and a point on the second airfoil adjacent said second surface, and a link pivoted to said first airfoil adjacent said first surface and pivotally attached at its outer end to the first mentioned link for defining movement thereof and of the projecting and retracting element in a predetermined arc with respect to said first airfoil, said arc of movement being generally adjacent the second of said pair of spaced surfaces.

5. Aircraft structure comprising a relatively fixed, substantially horizontal airfoil and a normally abutting, movable airfoil, said airfoils when in abutment having contiguous, spaced upper and lower surfaces, a pivotal connection between said airfoils adjacent their upper surfaces, motor means attached to a first one of said airfoils and having a projecting and retracting element directed toward the second of said airfoils, a link pivoted to said first airfoil adjacent said first surface and pivotally attached at its outer end to the projecting and retracting element for defining movement thereof in a predetermined arc with respect to said first airfoil, said arc of movement being generally adjacent the second of said pair of spaced surfaces, and a second link connecting pivotally between the pivotal connection of the first link with the projecting and retracting element and a point on said second airfoil adjacent said second surface.

6. Aircraft structure comprising a relatively fixed, substantially horizontal airfoil and a normally abutting, movable airfoil, said airfoils when in abutment having contiguous, spaced upper and lower surfaces, a pivotal connection between said airfoils adjacent their upper surfaces, motor means pivotally attached to said movable airfoil and having a projecting and retracting element directed toward said fixed airfoil, a link pivoted to said movable airfoil adjacent its upper surface and pivotally attached at its outer end to the projecting and retracting element for defining movement thereof in a predetermined arc with respect to said movable airfoil, said arc of movement being generally adjacent the lower surface of said movable airfoil, and a second link connecting pivotally between the pivotal connection of the first link with the projecting and retracting element and a point on said fixed airfoil adjacent its lower surface.

7. Aircraft structure comprising a relatively fixed, substantially horizontal airfoil and a normally abutting, movable airfoil, said airfoils when in abutment having contiguous, spaced opposite outer surfaces, each surface being substantially continuous with respect to the pair of airfoils when the airfoils are in abutment, a pivotal connection between said airfoils adjacent a first one of said surfaces, motor means pivotally attached to said movable airfoil and having a projecting and retracting element directed toward said fixed airfoil, a link pivoted to said movable airfoil adjacent said first surface and pivotally attached at its outer end to the projecting and retracting element for defining movement thereof in a predetermined arc with respect to said movable airfoil, said arc of movement being generally adjacent the second of said pair of spaced surfaces, and a second link connecting pivotally between the pivotal connection of the first link with the projecting and retracting element and a point on said fixed airfoil adjacent said second surface.

ALFRED I. UMSCHWEIF.